No. 629,813. Patented Aug. 1, 1899.
W. W. PHILBRICK.
MATCHER HEAD.
(Application filed Feb. 25, 1898.)
(No Model.) 3 Sheets—Sheet 1.
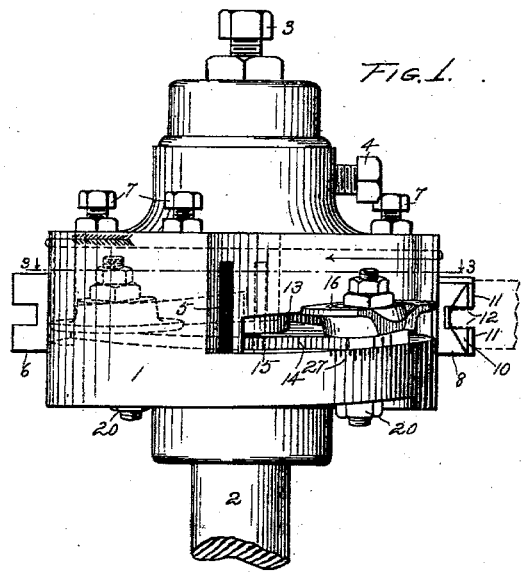 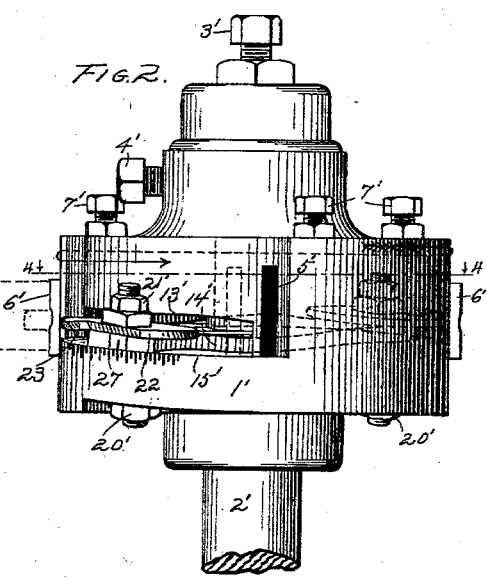
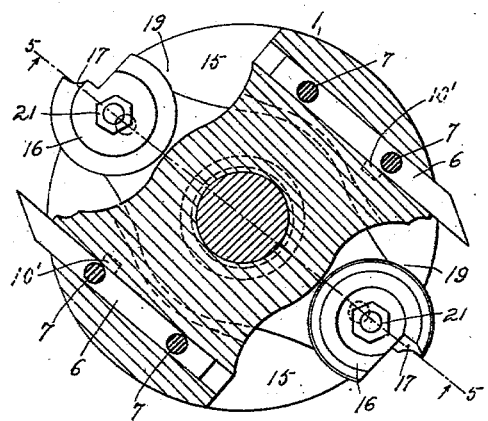 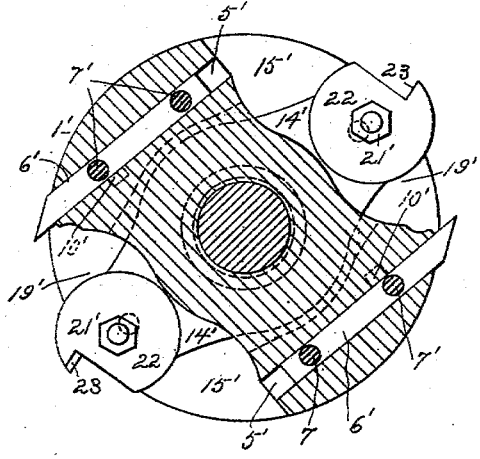
WITNESSES
Edward Wells.
Daniel H. Richardson.
INVENTOR,
Warren W. Philbrick
BY Frank E. Adams
ATTORNEY.

No. 629,813. Patented Aug. 1, 1899.
W. W. PHILBRICK.
MATCHER HEAD.
(Application filed Feb. 25, 1898.)
(No Model.) 3 Sheets—Sheet 2.
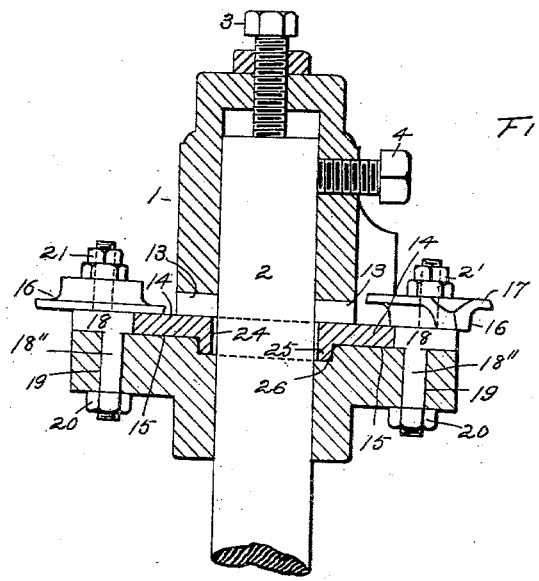
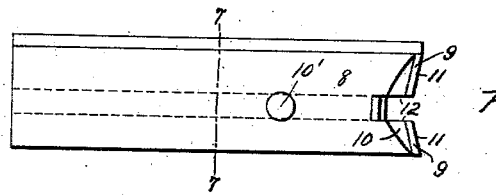
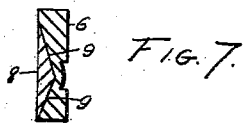
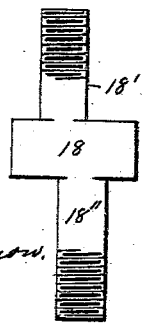
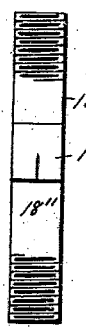
WITNESSES
Edward Wells.
Samuel H. Richardson.
INVENTOR.
Warren W. Philbrick
BY Frank E. Adams
ATTORNEY.

No. 629,813. Patented Aug. 1, 1899.
W. W. PHILBRICK.
MATCHER HEAD.
(Application filed Feb. 25, 1898.)
(No Model.) 3 Sheets—Sheet 3.
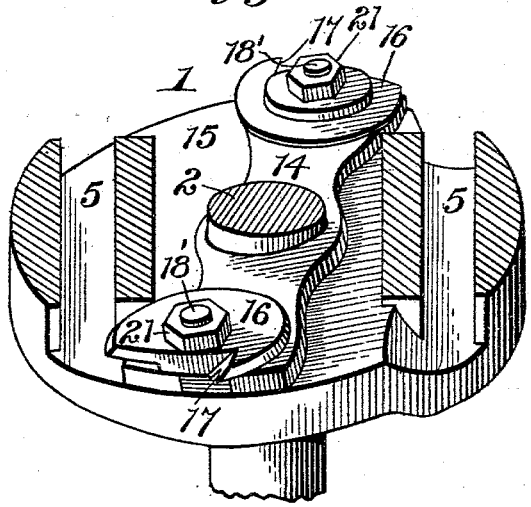
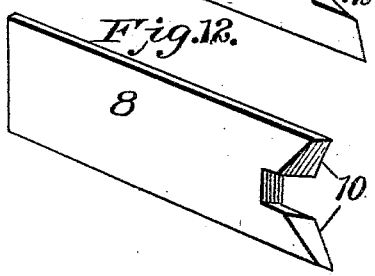
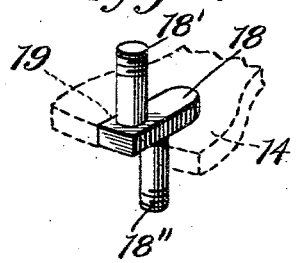
WITNESSES:
Edwin G. McKee
Geo. M. Anderson
INVENTOR
W. W. Philbrick
BY Geo. H. Parmelee
Asso. ATTORNEY.

UNITED STATES PATENT OFFICE.

WARREN WHEELER PHILBRICK, OF SEATTLE, WASHINGTON.

MATCHER-HEAD.

SPECIFICATION forming part of Letters Patent No. 629,813, dated August 1, 1899.

Application filed February 25, 1898. Serial No. 671,549. (No model.)

*To all whom it may concern:*

Be it known that I, WARREN WHEELER PHILBRICK, a citizen of the United States, residing at Seattle, in the county of King and State of Washington, have invented certain new and useful Improvements in Matcher-Heads, of which the following is a specification, reference being had therein to the accompanying drawings.

My invention relates to new and useful improvements in the construction of matcher-heads for use in tonguing and grooving, rabbeting, jointing, or otherwise matching the edges of boards; and my said invention consists in the matters hereinafter described, and pointed out in the appended claims.

The objects of my invention are to provide means whereby the blades or cutters will cut from the top and bottom sides of the board toward the center, so as to obviate all liability of splitting, chipping, or tearing the top and bottom corners of the edges of the boards, and also to provide means whereby cutters or bits used in finishing the tongues and grooves or rabbets upon the edges of the boards may be readily adjusted, so as to vary the thickness or width of the tongues and grooves or the rabbets, as may be desired.

A further object of my said invention is to provide an improved construction whereby the points and sides of the bits will be given clearance, so as to obviate liability of heating of said bits and clogging of the bits and consequent tearing of the lumber.

The several features of my improvement will be fully described with reference to the accompanying drawings, in which—

Figure 1 is a side elevation of my improved matcher-head, illustrating the arrangement of the cutters and one form of adjustable bits, the same being arranged to cut the tongues on one side of matched lumber. Fig. 2 is a similar view of the matcher-head for operation upon the groove sides of the boards. Fig. 3 is a horizontal sectional view of the tongue-cutting head, taken on line 3 3 of Fig. 1. Fig. 4 is a similar view of the grooving-head, taken on line 4 4 of Fig. 2. Fig. 5 is a vertical sectional view of the tongue-cutting head, taken on line 5 5 of Fig. 3. Fig. 6 is a detailed view of one form of cutter, showing the chip-breaker in position thereon. Fig. 7 is a cross-sectional view of the same, taken on line 7 7 of Fig. 6. Figs. 8 and 9 are detail views of the bit-securing bolts. Fig. 10 is a perspective view of a portion of the head, the upper part being broken away. Fig. 11 is a perspective view of one of the jointing-cutters. Fig. 12 is a similar view of one of the chip-breakers. Fig. 13 is a detail view showing the manner in which the bolts which secure the circular bits engage the bit-carrier.

Like characters of reference designate similar parts of the structure throughout the several views.

Referring more particularly to said drawings, the numeral 1 designates as a whole the matcher-head, which operates upon the tongue sides of the boards; 2, the arbor on which said head is mounted; 3, the usual adjusting-screw for varying the vertical adjustment of the head, and 4 the usual set-screw for securing it in adjusted position.

The head 1 is provided with suitably-disposed slots, as 5, for the reception of blades or cutters, as 6, which are secured in operative position in the head by suitable set-screws 7 in the usual manner. The blades or cutters 6 are preferably concaved upon their forward sides or faces, as at 9, so that when the cutting edges are properly ground the outer points of said edges will first engage with the work and the cuts will be made from the top and bottom edges of the board toward the center, thereby giving a shearing cut and obviating the liability of tearing or splitting the edges or corners of the boards. Chip-breakers, as 8, are engaged with the concave faces of the cutters or blades 6 and are provided with oblique forward edges, as 10, adjacent to the cutting edges of the cutters 6.

In Figs. 6 and 7 I have shown the particular form of cutters used in forming the tongues on the edges of matched lumber. In said form of cutters a slot, as 12, is formed in the central part of the cutting edge, the sides of said slot being devoid of cutting edges and arranged to leave an uncut portion or rib upon the edges of the boards of somewhat greater thickness than the finished tongues.

As indicated in the drawings, suitable retaining devices, such as the pins or lugs 10', may be formed on the chip-breakers, so as to engage with recesses or notches in the seats and securely hold the chip-breakers in place.

A suitable slot 13 is formed transversely in the head 1 and is arranged to adjustably receive a bit-carrier, as 14, which adjustably engages with an inclined seat or guide-surfaces, as 15, in the lower part of the head 1, so as to give a longitudinal incline and transverse pitch to the bit-carrier when positioned diagonally thereon with reference to the greatest line of pitch of said seat.

Suitable cutters or bits, as 16, are adjustably and detachably mounted on the opposite ends of the bit-carrier in any desired manner, and any suitable means is provided for securing said carrier in adjusted position upon its inclined seat. In practice I find it convenient to provide in the seat 15 suitable slots, as 19, for the reception of stud-bolts having angular central portions 18 and threaded upper and lower ends 18' and 18'', said bolts passing through the seat, the ends of the bit-carrier 14 and bits 16, and secured by suitable nuts, as 20 and 21, so as to lock the carrier in adjusted position upon the seat and the bits in adjusted positions upon the carrier in an obvious manner.

As shown in the drawings, the ends of the bit-carrier are conveniently slotted for the reception of the angular portions 18 of the stud-bolts, and the upper and lower threaded ends of said bolts are arranged out of line with each other, so as to present shoulders at the upper and lower sides of the angular portions 18. By this means the carrier 14 may be secured against rotation on the seat and the bits loosened for adjustment or the bits secured to the carrier while the carrier is loosened for adjustment, as desired, or both carrier and bits securely locked in position for operation, in an obvious manner.

The bit-carrier is conveniently made in the form of a bar centrally apertured for the passage of the arbor 2 loosely therethrough, as shown at 24. Upon the lower face of the bit-carrier is preferably provided an annular flange or rib, as 25, arranged to enter and engage with a corresponding annular shoulder or recess 26 in the face of the seat 15, as shown more particularly in Fig. 5 of the drawings. As also shown in Fig. 5, the lower outer edge of the annular flange 25 is conveniently rounded and the upper outer edge of the shoulder 26 is similarly rounded, so as to permit of a slight degree of vertical oscillation of the bit-carrier about the shaft, the said flange and ribs serving to center the bit-carrier upon its seat, while by reason of the fact that the aperture in the bit-carrier is somewhat larger than the arbor the bit-carrier is free to be adjusted without binding upon said arbor.

In Figs. 1, 3, and 5 I have illustrated the arrangement of the bits for use in dressing off and finishing the sides of the tongues of matched lumber. It follows from the described construction and arrangement of the inclined seat and the bit-carrier and bits that when said carrier is in engagement with said seat one end of said carrier will be elevated and the other end depressed to a perceptible degree respectively above and below the central portion of the said carrier, so that the bits engaged with said carrier will be correspondingly elevated or depressed. As also shown in the drawings, I prefer to secure the bits 16 at opposite ends of the bit-carrier, so that the cutting edge of one bit will operate upon the upper side and the cutting edge of the other bit upon the lower side of the tongue. The bits 16 are conveniently made of generally circular form, with suitable portions of their margins cut away to form oblique cutting edges 17. These bits are conveniently apertured centrally for admission of the upper ends 18' of the securing stud-bolts and are hence independently adjustable upon the ends of the bit-carrier by rotary movement thereon, the nuts 21 serving to securely hold them in adjusted position. In practice I find it convenient to make both bits 16 of substantially the same form, but with oppositely-arranged cutting edges 17, whereby the placing of the bits, as shown in the drawings, in which one of said bits is shown as inverted on the carrier, will bring one bit into position to dress off and finish the top and the other to similarly dress off and finish the bottom side of the tongue. The bits are also suitably shaped upon their peripheries to conform to the desired curvatures of the tongues, and the oblique cutting edges 17 will thus be given a corresponding contour, so as to produce the desired curvature upon the edges of the completed tongues.

In order to obtain the described point and side clearance of the bits 16, I prefer to arrange the bit upon the lower end of the bit-carrier to dress the upper side of the tongues and the bit on the elevated end of the bit-carrier to dress the lower side of the tongues.

The bit-carrier, it will be observed, is placed upon the seat in a position oblique to the line of greatest pitch of said seat, whereby the double incline of the carrier and of the bits to effect the side and point clearance is obtained by the described positioning of the bits upon the bit-carrier.

By the described construction and arrangement of the bit-carrier and the inclined seat therefor the said carrier is rendered capable of rotary adjustment in a plane parallel with the plane of inclination of the said seat, so as to vary the relative vertical position of the bits to operate in forming tongues of various thicknesses, while by the described oblique or inclined position of the bit-carrier both transversely and longitudinally the bits engaging therewith will be given corresponding double inclination, so as to afford a suitable clearance to the points and sides of the bits.

Referring now to Figs. 2 and 4 of the drawings, it will be observed that the head 1', of substantially the same construction as before described, is secured in adjustable engagement with arbor 2' by the set-screws 3' and 4'. Slots 5' for the reception of cutters 6' are provided in the head 1', but arranged so that the cutters 6' will operate by a rotation of the head 1' in a direction opposite to the rotation of head 1, and set-screws 7' serve to secure the cutters 6' in operative position in said slots. A transverse opening 13' is formed in the head 1' and is provided at its lower side with an oblique seat 15' for engagement with a bit-carrier 14', similar in construction to the bit-carrier 14; but it will be observed by reference to Figs. 1 and 2 of the drawings that the inclined seats 15 and 15' have opposite inclinations with respect to the direction of rotation of the respective cutter-heads.

Upon opposite ends of the bit-carrier 14' are mounted suitably-shaped grooving-bits 22, conveniently of generally circular shape and having portions of their marginal edges cut away to present oblique cutting edges 23. These grooving-bits are secured in the manner before described to the opposite ends of the carrier, and thus to the inclined seat, by stud-bolts constructed as before described and nuts 20' and 21', and the carrier and bits are adjustable upon the seat and the bits independently adjustable upon the carrier in the manner already described.

The cutters 6' are preferably concaved upon their forward sides and provided with chip-breakers in the manner before described with reference to the cutters 6, and, as shown in Figs. 3 and 4, said cutters 6 and 6' are preferably beveled or cut away upon their rear sides to give suitable clearance from point to heel of the same.

It will be understood that the cutters which operate upon the grooved sides of the lumber will simply dress off and joint the edges of the boards.

By the described construction of the cutters 6 and 6' with the concaved forward sides, whereby the cutting edges are rendered oblique, so as to engage first with the upper and lower corners of the edges of the boards, said edges are given a shearing cut from the top and bottom edges toward the center, thereby obviating all liability of splitting or tearing the corners off the boards.

By the described construction of the inclined seat 15' the bit-carrier 14' and the bits 22 having segmental adjustment with respect to said seat, (the inclination of the seat being such that the described double inclination will be given the bit-carrier and the bits,) the carrier and bits are rendered capable of adjustment in the manner before described to vary the width of the grooves in the edges of the boards, and said bits are arranged so that one bit will engage with the inner upper side of the groove and the other bit engages with the inner lower side of the groove, while by the double incline upon said carrier and bits suitable clearance will be given to the points and sides of the bits in an obvious manner.

As a matter of convenience I prefer to provide upon marginal edges of the inclined seats suitable scales of graduation, as at 27, and to provide upon the outer faces of the angular portions 18 of the stud-bolts or the ends of the bit-carriers registering marks or indications whereby the adjustment of the carriers may be accurately determined.

By the described construction of the cutters with the chip-breakers seated in the concaves thereof and the set-screws bearing upon the upper edges of the cutters the pressure of said screws causes the cutters to spring sufficiently at their central parts to bind upon the chip-breakers, thus assisting in securing the latter in position, and the pins or lugs on the chip-breakers serve to further secure them in position.

By my improved construction I am enabled to provide a matcher-head the tonguing-and-grooving bits of which are capable of ready adjustment to vary the thickness of the tongues and the width of the grooves as may be desired, while by the described operation of the cutters to have a shearing cut from the top and bottom surfaces toward the center all liability of splitting or tearing the edges of the boards is obviated and a smooth and uniform finish to the work is insured.

It will of course be understood that the forms of the cutters and bits may be variously modified in accordance with the character of the work to be done, and that all that is necessary in order to adapt my device for use in manufacturing rabbeted lumber, rustic, siding, molding, or ship-lap is to so modify the shapes of the cutters and bits as to produce the desired conformation of the edges of the finished work, the said cutters and bits in each instance operating in the manner already described.

While I have shown the bits as mounted on opposite ends of a bit-carrier which is in the form of a bar and engages with the inclined seat, yet it is obvious that other means may be employed to secure said bits in operative position upon the inclined seat, all that is necessary to insure a proper operation of said bits being to provide any suitable means for maintaining said bits at points diametrically opposite each other and to adjustably secure them in place upon the inclined seat.

Having thus described my invention, what I claim as new, and desire to secure by Letters Patent of the United States, is—

1. In a matcher-head, a rotatable carrier having an inclined bit-guiding surface, bits seated thereon at diametrically opposite points which points are in a line oblique with respect to the line of greatest pitch of said surface, said bits having a lateral inclination in planes parallel with the plane of inclination of said surface, and means whereby said bits may be adjusted laterally upon said surface to depress or raise the same, substantially as specified.

2. The combination with a rotatable head, having an inclined bit-guiding surface, of a bit-carrier mounted on said surface to have a partial rotation about the axis of the head, and bits mounted upon the end portions of said carrier in oblique planes parallel to the plane of inclination of said guiding-surface, a partial rotation of said bit-carrier upon said surface causing one of said bits to be raised and the other to be correspondingly depressed, substantially as specified.

3. The combination with a rotary head, having an inclined guiding-surface, of a bit-carrying bar mounted on said head to move upon said surface in the plane thereof, said bar being positioned upon said surface in a line oblique to the line of pitch thereof, whereby it has both an endwise and a lateral inclination and bits secured to the said bar and having a corresponding inclination, substantially as specified.

4. In a matcher-head, a rotatable carrier having thereon an inclined surface, and inclined or oblique bits or cutters secured to said carrier at points on a diametrical line thereof, which line is oblique to the line of greatest pitch of said inclined surface, and means for adjusting said bits on said surface to vary their vertical positions, said bits also being independently adjustable on their own axes, substantially as described.

5. A matcher-head, comprising a rotatable carrier provided with an inclined seat provided with segmental slots adjacent to its periphery, a bit-carrier movably mounted on said inclined seat and adjustable about the axis of rotation of the head in a plane parallel to the plane of inclination of the said seat, suitably-shaped bits or cutters positioned on said seat on a diametrical line oblique to the line of pitch of said seat, and stud-bolts extending through said segmental slots and bits to secure the latter in adjusted positions, substantially as described.

6. A matcher-head, comprising a rotatable carrier, provided with jointing-cutters, and with an inclined seat, and suitably-shaped bits secured to said seat and adjustable by partial rotation about the axis of the carrier, substantially as described.

7. A matcher-head, comprising a rotatable carrier provided with jointing-cutters arranged to dress the edge portions of the lumber, and with an inclined guiding-surface between said jointing-cutters, and bits secured to the said head and adjustable upon the said guiding-surface to raise or lower their cutting edges, said bits being arranged to shape the intermediate portions of the edges of the lumber, substantially as specified.

8. A matcher-head, comprising a rotatable carrier provided with a diametric slot or opening whose bottom wall is inclined, a bit-carrier adjustably mounted in said slot or opening and upon the said inclined wall, and bits or cutters carried by the opposite end portions of the said bit-carrier, whereby as the latter is adjusted upon the incline of said wall, the vertical distance between the cutting edges of said bits or cutters is changed, substantially as specified.

9. A matcher-head, comprising a rotatable carrier provided with an opening or slot extending diametrically therethrough and whose bottom wall forms an inclined guide-surface, a bit-carrier positioned on said surface in a line oblique with reference to the line of greatest pitch thereof, and adjustably engaging therewith, and bits or cutters carried by said bit-carrier, substantially as specified.

10. A matcher-head, comprising a rotatable carrier mounted upon an arbor and formed with a slot or opening extending diametrically therethrough and having an inclined bottom wall, a bit-carrier centrally pivoted within said slot and adjustable upon the inclined wall thereof by pivotal movement about the said arbor, suitably-shaped bits or cutters upon opposite end portions of the said bit-carrier, and suitable means for locking the bits to the bit-carrier and the bit-carrier to the head, substantially as described.

11. A matcher-head, comprising a rotatable carrier mounted on an arbor, and provided with a transverse slot or opening and with an inclined seat, a bit-carrier apertured centrally to admit said arbor, and adjustably engaging said seat and provided with suitable bits carried by its opposite ends, and an annular flange upon said bit-carrier engaging a corresponding shoulder in the seat to center said bit-carrier, substantially as described.

12. A matcher-head, comprising a rotatable carrier having a transverse slot or opening and an inclined seat, a bit-carrier adjustable on said seat, bits carried by opposite ends of said bit-carrier and locking-bolts comprising central, offset angular parts to engage with the ends of said bit-carrier and with the threaded upper and lower ends extending through said seat and bits and providing shoulders at the upper and lower sides of said angular portions and securing-nuts engaging with said threaded ends for locking the bits to the carrier and the carrier to the seat, substantially as described.

13. In a matcher-head, the combination with the rotary carrier having jointing-cutters having a separated upper and lower cutting portion, of bits positioned on said carrier to operate upon the intermediate portions of the edges of the lumber, said carrier having an inclined guiding-surface for said bits and upon which they are adjustable to effect a depression or elevation thereof, substantially as specified.

14. A matcher-head, comprising a rotatable carrier, suitable jointing-cutters carried thereby and having separated upper and lower cutting portions whose cutting edges recede both inwardly and rearwardly from their outer corners, whereby they are caused to make a shearing cut from the side edges of the lumber toward the center thereof, and suitably-shaped bits positioned upon the carrier and arranged to operate upon intermediate portions of the edges of the lumber, to give a desired conformation thereto, substantially as described.

15. A matcher-head, comprising a rotatable carrier, suitable jointing-cutters carried thereby and having separated upper and lower cutting portions whose cutting edges recede both inwardly and rearwardly from their outer corners, whereby said jointing-cutters have shearing cuts from the sides toward the central portion of the edges of the lumber, and leave uncut portions between the jointed faces of the said edges, and suitably-shaped bits positioned upon the carrier and arranged to shape the said uncut portions of the edges of the lumber to a desired conformation, substantially as described.

16. A matcher-head, comprising a rotatable carrier, provided with jointing-cutters, concaved upon their forward side faces and beveled in rear of their cutting edges, whereby said jointing-cutters have shearing cuts from the sides toward the central portion of the edges of the lumber, and bits positioned upon the carrier to operate upon and give a desired conformation to intermediate portions of said edges, said bits being positioned upon an inclined diametrical line, and also inclined or pitched laterally with respect to said line, whereby side and point clearance of said bits is provided, substantially as described.

17. In a matcher-head, a rotatable carrier having jointing-cutters formed with separated upper and lower cutting portions, said carrier also having an inclined bit-guiding surface between said jointing-cutters, and a bit seated upon said inclined surface, and adjustable thereon to raise or depress its cutting edge, substantially as specified.

18. In a matcher-head, the combination with a rotary carrier having jointing-cutters formed with separated upper and lower cutting portions, of bits positioned on said carrier to operate upon the intermediate portions of the edges of the lumber, said carrier having an inclined guiding-surface for said bits and upon which they are adjustable to effect a depression or elevation thereof, said bits having their edges formed with receding bevels, substantially as specified.

In testimony whereof I affix my signature in presence of two witnesses.

WARREN WHEELER PHILBRICK.

Witnesses:
EDWARD WELLS,
W. PARRY SMITH.